United States Patent
Haya

(10) Patent No.: US 11,091,328 B2
(45) Date of Patent: Aug. 17, 2021

(54) LINEAR MOTOR CURVE MODULE WITH IMPROVED GEOMETRY

(71) Applicant: ROCKWELL AUTOMATION TECHNOLOGIES, INC., Mayfield Heights, OH (US)

(72) Inventor: Oliver C. Haya, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 299 days.

(21) Appl. No.: 16/146,023

(22) Filed: Sep. 28, 2018

(65) Prior Publication Data
US 2020/0102160 A1    Apr. 2, 2020

(51) Int. Cl.
*B65G 54/02* (2006.01)
*H02K 41/03* (2006.01)
*B61B 13/04* (2006.01)

(52) U.S. Cl.
CPC .......... *B65G 54/02* (2013.01); *H02K 41/033* (2013.01); *B61B 13/04* (2013.01); *B65G 2203/0283* (2013.01); *B65G 2203/043* (2013.01)

(58) Field of Classification Search
CPC .......... B60L 13/00; B60L 13/03; B60L 13/04; B60L 13/06; B60L 13/08; B60L 13/10
See application file for complete search history.

(56) References Cited

U.S. PATENT DOCUMENTS 6,876,107 B2 * 4/2005 Jacobs .................. H02K 11/215
310/12.19

* cited by examiner

*Primary Examiner* — Robert J McCarry, Jr.
(74) *Attorney, Agent, or Firm* — Fletcher Yoder, P.C.

(57) ABSTRACT

A linear motor system has multiple modular track sections joined end-to-end to form a track along which movers may be displaced by the control of magnetic fields generated by coils disposed in each track section. A curved track section is provided that includes a non-constant radius of curvature that is a non-linear function of the run length along the curved track section. The curved track section may have a number of different radii of curvature, and one or more of them may be based on a non-linear function of the run length. The resulting curvature provides improved dynamic performance of movers driven along the curved track section.

20 Claims, 5 Drawing Sheets

LINEAR MOTOR CURVE MODULE WITH IMPROVED GEOMETRY

BACKGROUND

The invention relates generally to linear motor systems having curved sections, and more particularly, to motors in which modular track and motor sections have unique geometries designed to provide improved dynamic characteristics.

A range of linear motors are known and in use throughout industry, particularly in manufacturing, filling, and material handling applications. Such motors typically include an elongated track in which motor coils are associated with a stator core, such as a laminated core. The coils may have various orientations, depending upon the motor design. A permanent magnet mover may be placed on the track, and fields resulting from selective energization of the track coils interact with permanent magnets of the mover to cause the mover to move along the track in desired directions, speeds, and accelerations, and to stop and start at desired locations. Highly flexible and precise control of movement of one or many movers may be achieved by control and driver circuitry associated with the coils of the track sections.

Because available track sections may need to be designed for a wide range of applications, orientations, and path layouts, they are typically made modular. Currently available tracks include either straight sections or curved sections, and these are typically joined end-to-end to provide the desired transport path for the movers. At turns or curves, modular curved sections may be joined to form various angles, such as 45 degrees, 90 degrees, and 180 degrees. Following a desired change in direction, then, the ends of the curved sections are joined with modular straight sections to continue the desired layout.

While such modular designs provide highly flexible design alternatives, they are not without drawbacks. For example, the geometry of the tracks in curved sections, and the transition between straight sections and different radii of curvature can significantly affect the dynamics of the system, and may require slowing movers as they progress around the tracks. In particular, control signals applied to displace movers along the tracks typically regulate position and derivatives of position, specifically velocity and acceleration. But even higher order derivatives of position can affect the dynamics of the movers and payloads carried by them. These may be somewhat improved by the use of geometries such as clothoids and splines, as well as the use of multiple different clothoid or spline geometries in each curve, but the dynamics resulting from higher order derivatives of position still limit performance.

There is a need, therefore, for improved linear motor designs that can address at least some of these concerns.

BRIEF DESCRIPTION

The present disclosure relates to linear motor systems designed in view of such needs. In accordance with certain aspects of the disclosure, a linear motor system comprises a permanent magnet mover configured to be displaced by a controlled magnetic field, a modular straight track section, and a modular curved track section positionable adjacent to the modular straight track section to provide a continuous track. Each track section comprises a plurality of coils energizable to create the controlled magnetic field for movement of the mover, and each track section is configured to support and guide the mover in movement along the track sections. Control and driver circuitry is coupled to the coils and configured to control energization of the coils to create the controlled magnetic field. The curved track section has a curvature non-constant radius of curvature that is a non-linear function of a run length along the curved track section.

In accordance with another aspect of the disclosure, a modular curved track section is provided that is positionable adjacent to other modular track sections to provide a continuous track, wherein the curved track section has a curvature non-constant radius of curvature that is a non-linear function of a run length along the curved track section.

In accordance with a further aspect of the disclosure, a linear motor system comprises a permanent magnet mover configured to be displaced by a controlled magnetic field, a modular straight track section, and a modular curved track section positionable adjacent to the modular straight track section to provide a continuous track. Each track section comprises a plurality of coils energizable to create the controlled magnetic field for movement of the mover, and each track section is configured to support and guide the mover in movement along the track sections. Control and driver circuitry is coupled to the coils and configured to control energization of the coils to create the controlled magnetic field. The curved track section has a curvature following a geometry that results in the mover, when moving under the influence of coils energized at a fixed rate along the curved track section, experiencing a non-linear jerk.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1A:
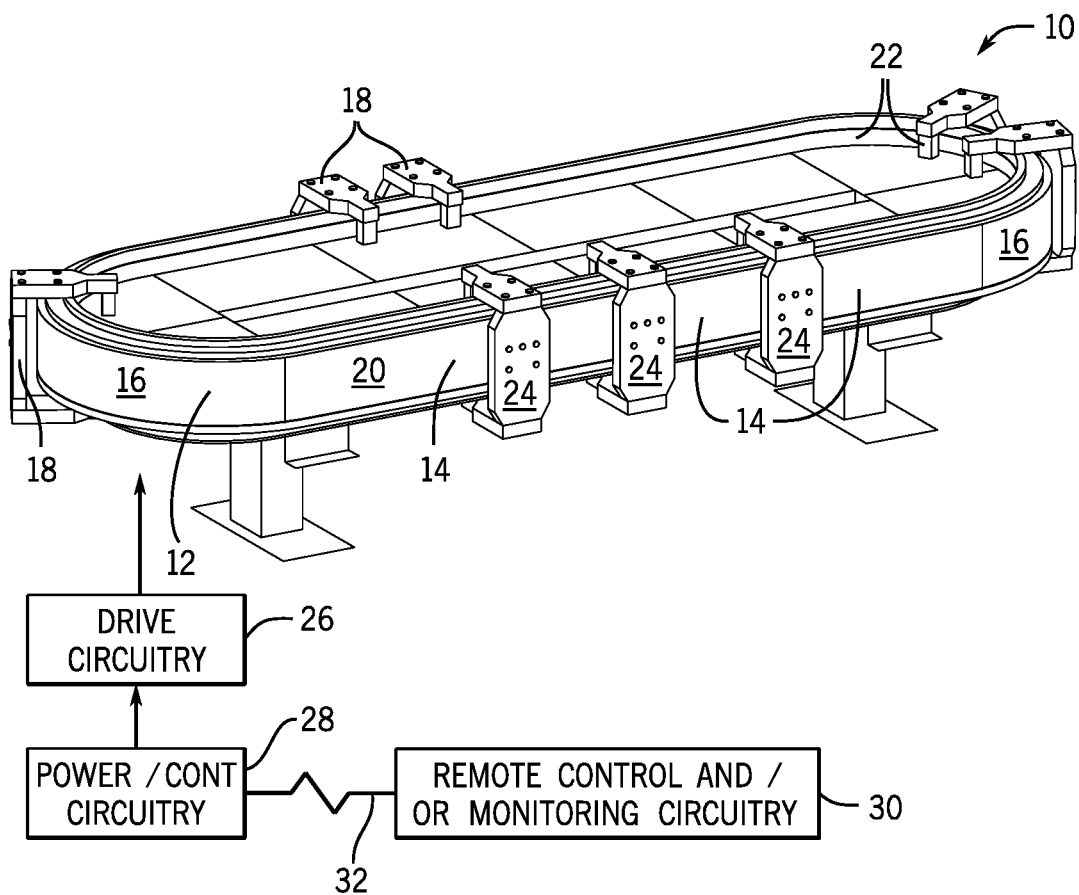
FIG. 1A is a perspective view of an exemplary linear motor system illustrating straight and curved track modules and several movers positioned for movement along the modules.

Turning now to the drawings, and referring first to FIG. 1A, a linear motor system 10 as illustrated for moving articles or products around a track 12. As will be appreciated by those skilled in the art, in many applications, the linear motor system will be configured to inter-operate with other machines, robots, conveyers, control equipment, and so forth (not separately shown) in an overall automation, packaging, material handling or other application. The linear motor system itself generally comprises a "linear motor" as discussed below, in which the moving components are positioned, accelerated, decelerated, and generally moved under the influence of controlled magnetic and electromagnetic fields. In the illustrated embodiment, the track 12 comprises straight track modules 14 and curved track modules 16. As discussed below, at least one of the curved track modules incorporates an improved curve geometry that offers enhanced dynamic performance. These modules may be generally self-contained and mountable in various physical configurations, such as the oval illustrated in FIG. 1A. It should be noted that other configurations are equally possible as discussed below. The configurations may form closed loops of various shapes, but may also comprise open-ended segments. The system further comprises one or more movers 18 which are mounted to and movable along the track. Again, the position, velocity, acceleration, and higher order derivative parameters are controllable for these movers by appropriate control of the coils of the system that are energized and de-energized as discussed below. In the illustrated embodiment, the movers 18 interact with stationary elements in and around an outer periphery 20 of the track modules, although other configurations are envisaged. A sensor system 22 is provided to detect positions of the movers around the track, and such center systems may comprise permanent magnets, energized coils, Hall effect sensors, or any other suitable devices. In general, one component of the sensor system will be mounted on the movers, while another component will be mounted at fixed locations around the track.

Each mover further comprises a mounting platform 24. In an actual implementation, various tools, holders, support structures, loads, and so forth may be mounted to this mounting platform. The movers themselves may be configured differently from those shown in order accommodate the various loads. While a horizontal configuration is illustrated in FIG. 1A, other orientations may also be provided, such as ones in which the illustrated oval is generally stood on a side or end, or at any angle between.

The system further comprises circuitry for controlling a movement of the movers. In the embodiment illustrated in FIG. 1A, this circuitry includes a drive circuitry 26 that provides signals to each track module, and specifically individual coils (see below) of the track modules to create electromotive forces that interact with magnets on the modules to drive the modules to specific locations, and at specific velocity, accelerations, and so forth. This drive circuitry may typically include inverter circuitry that makes use of power electronic switches to provide drive power to the individual coils of each module in a controlled manner. In some embodiments, the drive circuitry may be included in each individual module, and signals provided to the drive circuitry by power and control circuitry 28. This power and control circuitry (and the drive circuitry) may receive feedback from the movers and/or from the sensor system to detect the location, velocity, acceleration, and so forth of each mover. In certain embodiments the movers may also be configured to be recognized by the power and control circuitry 28 as individual axes that are independently controlled, but with regulation of their position, velocity and acceleration to avoid conflicts, collisions, and so forth. The particular motion profile implemented by the power and control circuitry 28 will typically be configured and implemented upon the design and commissioning of the system, here again, depending upon the particular task to be performed. Finally, various remote control and/or monitoring circuitry 30 may be provided and this circuitry may be linked to the system by one or more networks 32. Such remote circuitry may generally allow for coordination of the operation of the transport system with other automation components, machine systems, manufacturing and material handling machines, and so forth.

Figure 1B:
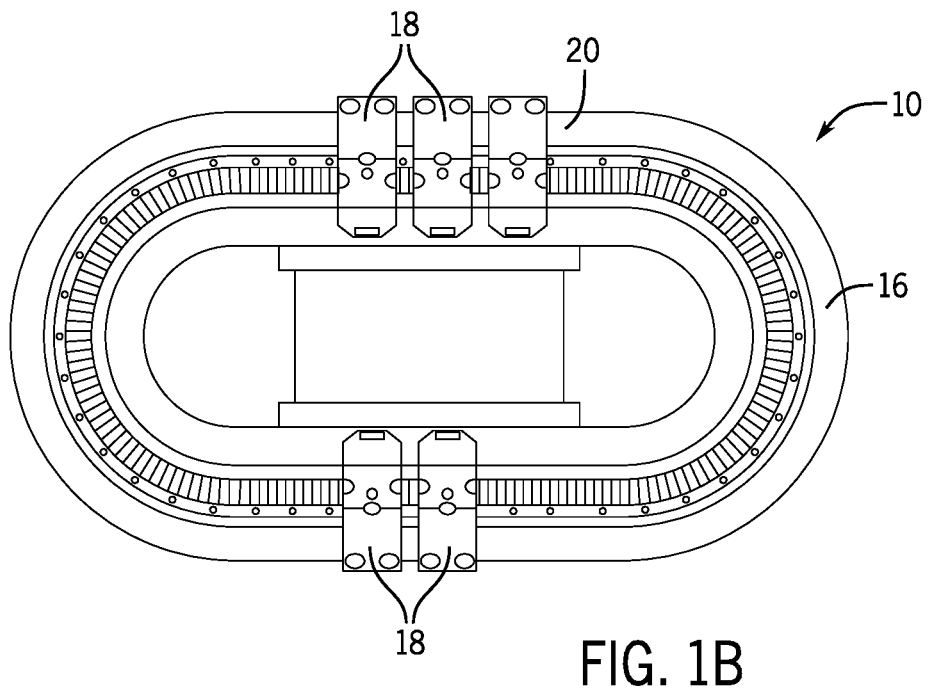
FIG. 1B is a top view of a similar linear motor system in which motor coils are positioned differently than in the system of FIG. 1A.

FIG. 1B illustrates an alternative configuration for a similar linear motor system. However, in this configuration, rather than motor coils being positioned around the periphery of the system, coils are positioned around the top of the system, in a generally planar arrangement. Magnet assemblies of each mover 16 face these coils and are spaced from the coils by a small air gap. Straight and curved track modules are assembled, as above, to form an oval, although other shapes and layouts may be formed. The curved track modules may be adapted with modified spline geometries, as in the case of the system shown in FIG. 1A, and as described in greater detail below. Moreover, in this embodiment as well, at least one of the curved modules comprises an improved curve geometry that offers enhanced dynamic performance.

Figure 2:
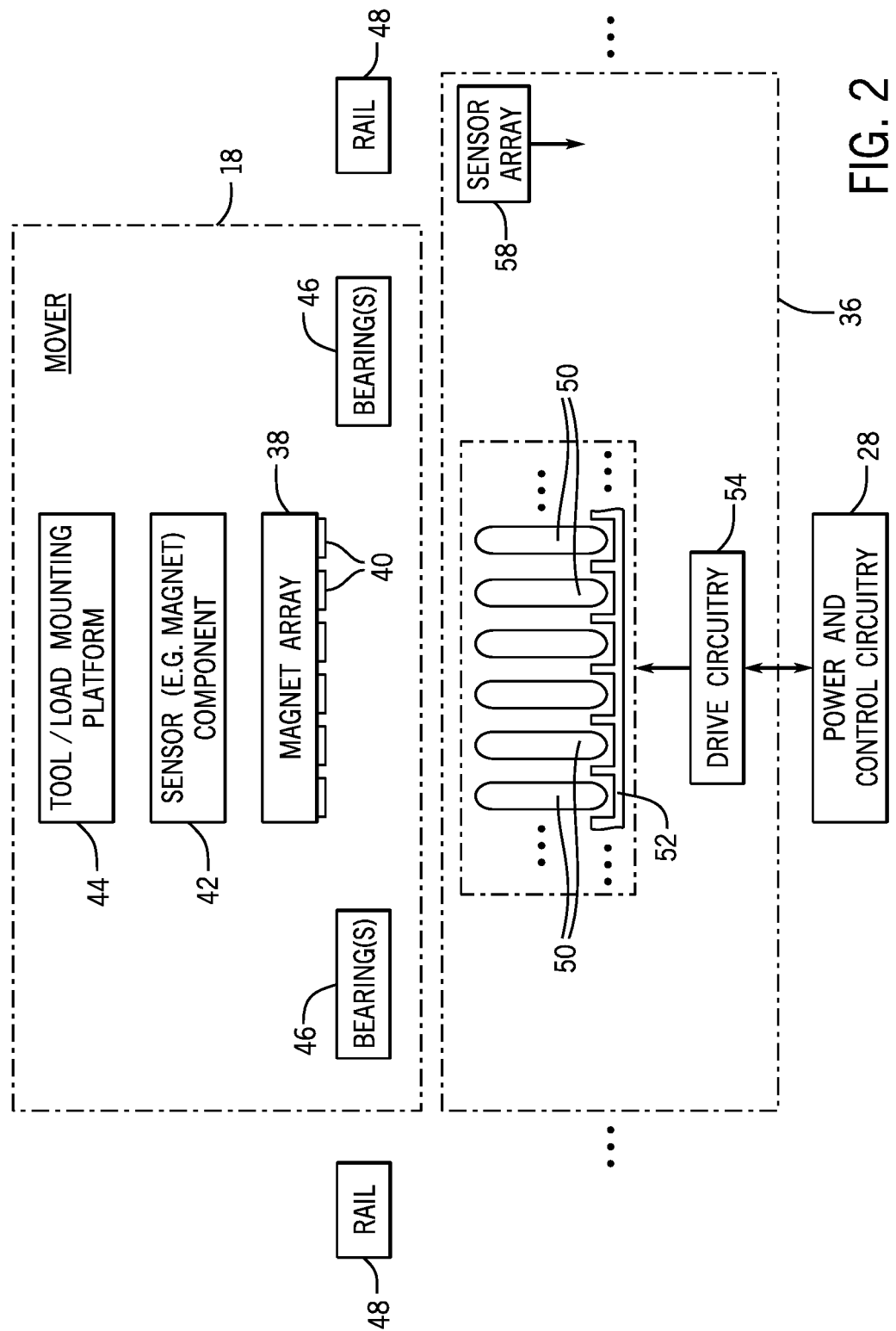
FIG. 2 is a diagrammatical representation of the system of FIGS. 1A and 1B.

FIG. 2 is a diagrammatical representation of the linear motor system showing one track module 36 and one mover 18 positioned along the track module. The track module illustrated in FIG. 2 may be a straight or curved track module, these two differing in their physical configuration, and certain of the actual characteristics owing to the curved nature of the curved modules as discussed below. In general, however, each mover comprises a magnet array 38 on which a number of magnets 40 are mounted. These will typically be permanent magnets and are mounted such that a small air gap is provided between the magnets and coils of the track module described below. As shown in FIG. 2, the track module 36 further comprises a sensor component 42, such as a permanent magnet. It should be noted, however, that the particular sensor component included in the track module will depend upon the nature of the sensing strategy, the sensing resolution, the position of the sensor on the mover (and cooperating components on the track module), and so forth. The platform 44 is provided on the mover while mounting tools and the like as discussed above. Finally, bearings and associated components (e.g., rollers) are mounted to the mechanical structure of the mover and serve to interact with one or more rails, as indicated by reference numerals 46 and 48, respectively. These bearings and rails allow the mover to remain securely attached to the track modules while allowing relatively free movement of the movers along the track modules and supporting mechanical loads and forces encountered during motion.

The track module 36 will typically include a series of parallel coils 50 that are associated with a stator or armature 52. In currently contemplated embodiments, these coils are mounted into slots in the stator, and the stator itself may be made of magnetic material formed into a stack of laminates and structured to allow for mounting within the track module housing. Particular configurations, magnetic, mounting structures and the like of the coils and stator components are generally beyond the scope of the present disclosure. Drive circuitry 54 may be included in each module as discussed above to allow for controlled power signals to be applied to the coils in order to drive and position the movers appropriately around the track module. Finally, a sensor array 56 is provided in each track module to allow for interaction with the sensor components of the movers. This sensor array will typically provide feedback that can indicate the position of the movers, and can be used to derive velocity, acceleration, jerk and other motion parameters. In the illustrated embodiment a plurality of track modules may be mounted end-to-end and interconnected with one another and/or with the power and control circuitry to received signals used to power the coils.

As will be appreciated by those skilled in the art, track modules, along with the magnet arrays of the movers, will generally form what may be considered a linear motor system. That is, electromotor force is generated by the controlled fields of the coils and interaction between these fields and the magnetic fields of the magnet array serve to drive the mover into desired positions, at desired speeds, and so forth. As noted above, these coils and the linear motor itself may be designed in accordance with various configuration strategies, such as ones having the coils arranged around a periphery of the track modules, ones in which the coils are generally planar (in a top or bottom position of the modules), and so forth. Although the "linear" motor system may be used in the present disclosure, it should be appreciated that curved modules in various configurations are intended to be included under this rubric.

Figure 3A:
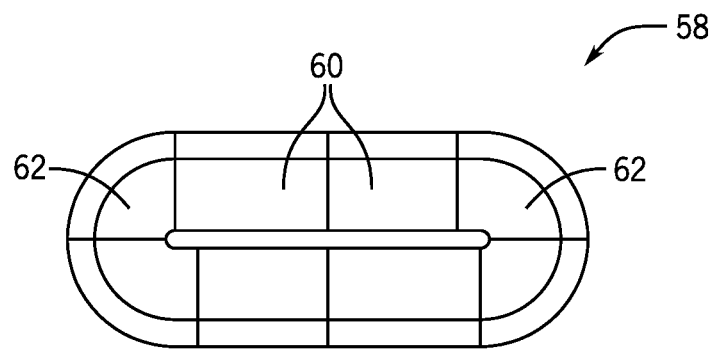
FIGS. 3A-3C are diagrammatical representations of different track configurations that may be developed based upon curved track sections according to the present disclosure.
Figure 3B:
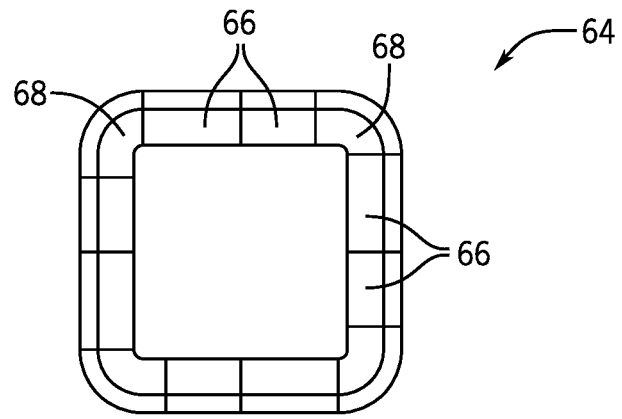
Figure 3C:
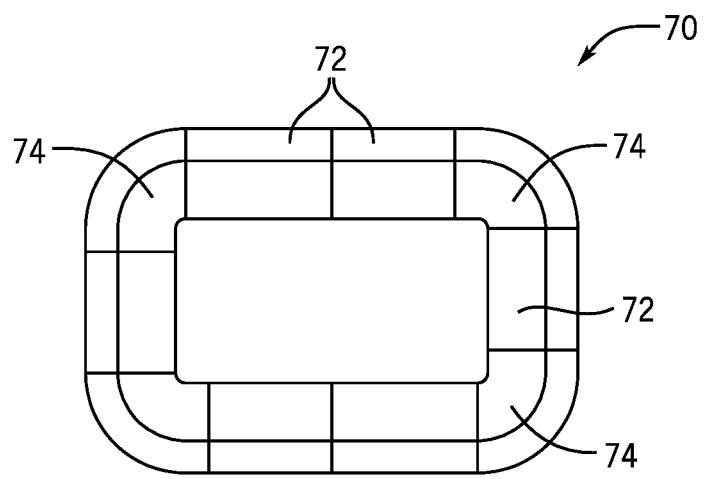

In addition to the configurations shown in FIGS. 1A and 1B, various other physical layouts may be employed, such as those shown in FIGS. 3A, 3B and 3C. FIG. 3A illustrates a linear motor system having an oval configuration 58. Here the configuration is made of several straight modules 60 and end modules 62 that form 180 degree curves. Any number of straight modules may be provided, and as described more fully below, the curved modules may be provided in a single unit forming 180 degrees to close the oval or in smaller units of 90 degrees, 45 degrees, 30 degrees, and so forth. As shown in FIG. 3B, square configurations 64 may be similarly formed by insertion of straight modules 66 between 90 degree modules 68. In the rectangular configuration 70 of FIG. 3C, straight modules 72 are inserted between 90 degree modules 74, with a different number of straight modules on each side to form a generally rectangular configuration. Other configurations may include various turns, interior and exterior curves, S-shapes, open-ended track sections, and so forth.

It should also be noted that a number of different coil and magnet configurations may be employed with the innovations summarized in the present disclosure. These may include, for example, the peripheral coil and facing magnet arrangements discussed above, and the generally planar coil arrangements with facing magnet arrangements also discussed above. Other arrangements may include opposing coils and/or magnets, with the cooperating magnets/coils in facing relation, T-shaped magnet and/or coil structures, and so forth.

As discussed in greater detail below, the curved track modules of the transport system are configured with a curvature that has a non-constant radius, but that is a non-linear function of the run length along the curved track module. That is, for example, the radius of curvature may be function of a higher or different order of the run length. In some presently contemplated embodiments, for example, the entry of the curved track module may have a gentle curvature, such as with a radius proportional to the inverse of an order of the run length less than one (e.g., the square root). Other radii of curvature may be proportional to the inverse of higher orders of the run length, such as the square, or cube. Still further, more complex geometries may be used that may be defined as a polynomial where the run length is a term. It is also contemplated that more than one radius may be used, such as a gentle radius portion (e.g., proportional to an inverse of a order of the run length less than one) at the entry (and exit), a constant radius section at a point near or adjacent to this portion, and a more aggressive radius thereafter (e.g., proportional to an inverse of an order of the run length greater than one).

In practice, to accommodate smooth transitions, the curved track section may be laid out as a progression of curvatures having progressively greater and/or progressively smaller radii. One or more of the curvatures may have a constant radius, and one or more of the curvatures may comprise a conventional clothoid form. Still further, integral straight sections may be provided on one or both ends of the curved track section.

Combinations of these may be used to provide desired dynamics. Control signals applied to the coils of the curved track section may afford some degree of control of the mover dynamics, but the curvature of the track aids in achieving smooth control and improved dynamics. In particular, the track geometry enables control of position, velocity, and acceleration, but also of higher order derivatives of jerk (rate of change of acceleration) and snap (rate of change of jerk). In some cases the control signals may be simplified by virtue of the dynamics offered by the improved track geometry. That is, assuming constant pitch of the coils in the curved track section, and energization of successive coils at fixed intervals, the geometries may provide for jerk and/or derivatives of jerk that are finite (as opposed to instantaneous and theoretically infinite as in conventional geometries).

Figure 4:
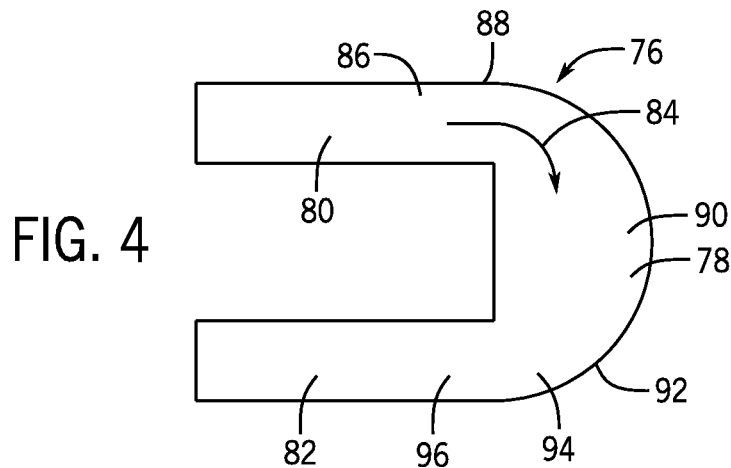
FIG. 4 is a diagrammatical view of an example curved track section having the new geometry according to the disclosure.

FIG. 4 is a diagrammatical view of an example curved track section having the new geometry according to the disclosure. This generic view is provide for the following discussion of options for improved curvatures that enhance the dynamic characteristics of the resulting linear motor system. The curved track section 76 is shown as having a curved portion 78, and optional integral straight portions 80 and 82 at either end. A direction of travel is indicated by arrow 84. It should be noted, however, that while a section of approximately 180 degrees is illustrated, and a direction of travel is indicated, other extents can be defined (as discussed below), and the direction of travel could be reversed. In some embodiments, the curvatures are defined to accommodate a particular direction of travel (e.g., into or out of the curved section), while in others, the curved section is essentially symmetrical, such that the direction of travel can be reversed without materially altering the dynamic performance.

The illustration of FIG. 4 shows several points or portions along the curved section, including what may be termed a per-entrance location 86, an entrance location 88, a curve 90, an exit location 94, and a post-exit portion 96. As discussed below, by selection of the curvatures of one or more of these portions or locations, different motion profiles may be obtained. Example motion profiles are shown in FIGS. 5 and 6.

Figure 5:
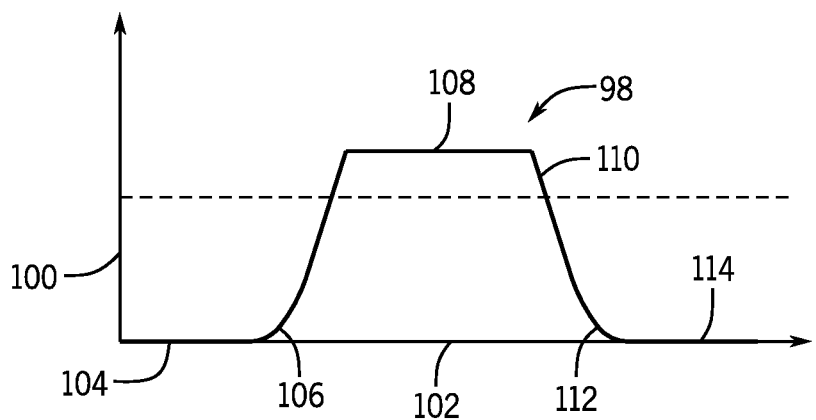
FIGS. 5 and 6 are graphical representations of motion profiles obtainable by selection of geometries of the section shown in FIG. 4 according to the disclosure.

In the example of FIG. 5, a motion profile 98 is illustrated graphically as centripetal acceleration along axis 100, as a function of travel distance along axis 102. Assuming a constant linear velocity (e.g., resulting from moving under the influence of coils energized at a fixed rate along the curved track section), the mover would experience a finite jerk and/or a finite snap. In the graphical illustration of FIG. 5, points along the profile correspond to locations or portions of FIG. 4 as follows: location 104 corresponds to per-entrance location 86, location 106 corresponds to entrance location 88, location 108 corresponds to curve 90, location 112 corresponds to exit location 94, and location 114 corresponds to post-exit portion 96. Location 110 in FIG. 5 is a point between the curve and the exit location.

In this example, the geometry of the curved section has been selected to provide a "gentle" entry, such as by creating a radius of curvature that is proportional to an inverse of the square root of the run (arc) length (that is, the length of travel from the entrance point. As the radius decreases, the selected radius changes to a curvature that is proportional to the inverse of the run length (e.g., a clothoid curvature). The minimum radius is pre-determined, such as based upon the design and performance of bearings and other mechanical components of the track, the mover, or both, or upon such factors as the anticipated loading of the mover. Other factors may include, for example, the anticipated envelope or space available for the curve. The peak centripetal acceleration is higher than it would be for a constant (fixed, circular) radius, however, the transition is linear, resulting in a constant, finite third derivative of position (i.e., derivative of acceleration, or jerk). In this case, the fourth derivative of position (snap) may also be finite during the straight-to-curve transition, but may still have an "infinite" nature between the variable and constant radius portions. There is a tangential acceleration throughout the variable radius portion, which stops once on the constant radius portion, and the jerk in that portion is zero.

Figure 6:
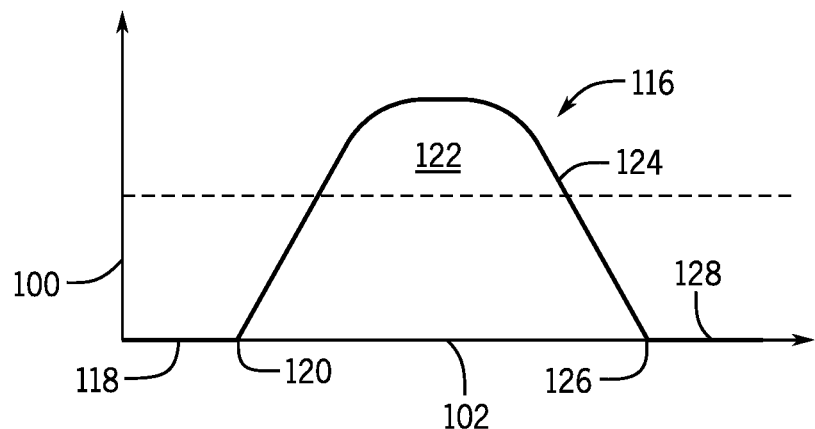

FIG. 6 illustrates another motion profile available by another selection of the curvatures of the curved section of FIG. 4. In this case, the motion profile 116 is again depicted graphically as centripetal acceleration as a function of travel distance. Here, the points along the profile correspond to locations or portions of FIG. 4 as follows: location 118 corresponds to per-entrance location 86, location 120 corresponds to entrance location 88, location 122 corresponds to curve 90, location 124 corresponds to exit location 94, and location 128 corresponds to post-exit portion 96. Location 124 in FIG. 5 is a point between the curve and the exit location.

In this example, as the mover would move from the straight portion to the curved portion, the radius is changes as a function of the inverse of the run (arc) length (e.g., clothoid). Approaching the apex of the curve, a higher order function is applied to the curvature, such as a radius that changes proportionally with the inverse of the square of the inverse of the run length. As a result, the snap is still has an "infinite" nature for a brief moment, but only at the start and end of the curve. At the apex it has smooth transitions.

It should be noted that in practice, various combinations of these features may be incorporated in to the curved track section. For example, the multiple curvatures may be used, including portions that have a changing radius that is a function of an inverse of a power of the run length lower than unity, portions that have a changing radius that is a function of an inverse of a power of the run length greater than unity, as well as integral straight portions, integral clothoid portions, and integral portions having a constant radius (circular). The resulting geometries may be allow for coil control signals that are coordinated to provide much improved dynamic characteristics of movers as they advance from straight sections, into curved sections, through curved sections, and out of curved sections.

Figure 7A:
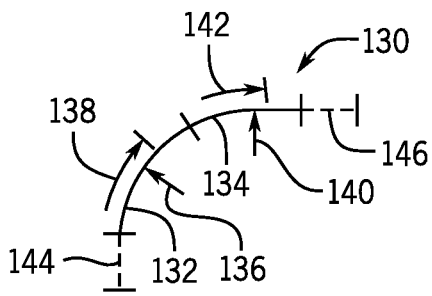
FIGS. 7A-7G are line diagrams of various curved track section configurations incorporating the new geometries offered by the present techniques.
Figure 7B:
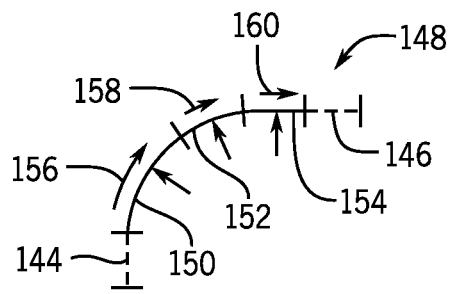
Figure 7C:
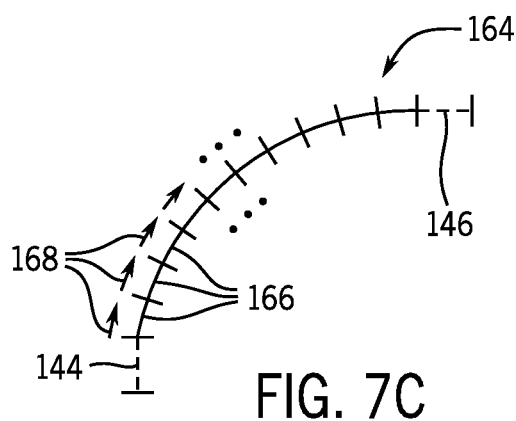

FIGS. 7A-7G are line diagrams of various curved track section configurations incorporating the new geometries offered by the present techniques. FIGS. 7A-7C represent example curved track section configurations that cover approximately 90 degrees of travel. The section 130 shown in FIG. 7A has a first portion 132 followed by a second portion 134. The first portion has a radius of curvature 136 that varies as a function of the run length, indicated by arrow 138, while the second portion has a radius of curvature 136 that varies as a function of the run length 142. As noted above, the two portions may differently varying radii (e.g., changing progressively as a different function of the run length, such as proportionally with the inverse of a different power of the run length). Also illustrated as two optional integral straight portions 144 and 146 (either or both may be provided, or in some embodiments no integral straight portion is provided). In the embodiment of FIG. 7B, the curved track section 148 has three different portions 150, 152, and 154, that each have differently changing curvatures, as indicated by reference numerals 156, 158, and 160. Here again, such curvatures may include radii that vary with an inverse of a different power of the run length, or that may be clothoid in form, constant radius in form, or some other geometry.

The illustration of FIG. 7C is intended to demonstrate that, in practice, a curved track section 164 may comprise a large number of portions 166 each having a differently changing curvature 168. Such shapes may facilitate manufacture, such as by "stepwise" changing the curvature of each portion to provide an overall curvature that offers the dynamic performance desired (e.g., acceleration, jerk, snap), in conjunction with control signals applied to the coils of the track section.

Figure 7D:
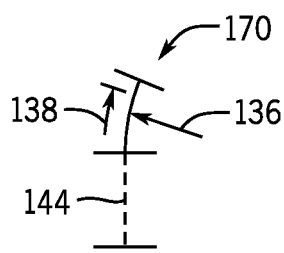
Figure 7E:
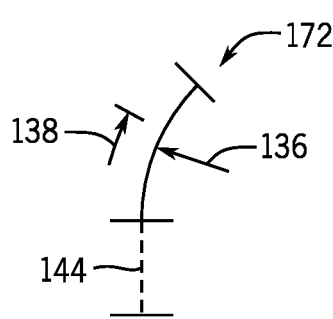
Figure 7F:
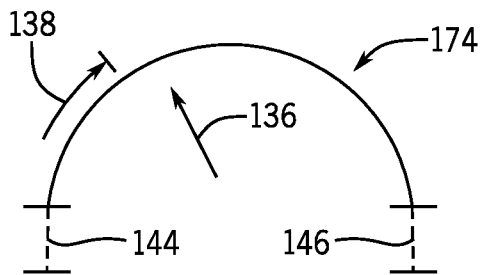

FIGS. 7D-7F illustrate that different segments may be formed by the present techniques. These might include, for example, a section 170 of approximately 22.5 degrees, as shown in FIG. 7D, a section 172 of approximately 45 degrees as shown in FIG. 7E, and a section 174 of approximately 174, as shown in FIG. 7F. In these illustrations, the different track sections are shown as using a single varying radius, but it should be understood that any and all of the multi-curvature techniques described above may be employed on these as well. The resulting collection of sections may form a modular product line from which system designers may select to configure a wide variety of track shapes and layouts.

Figure 7G:
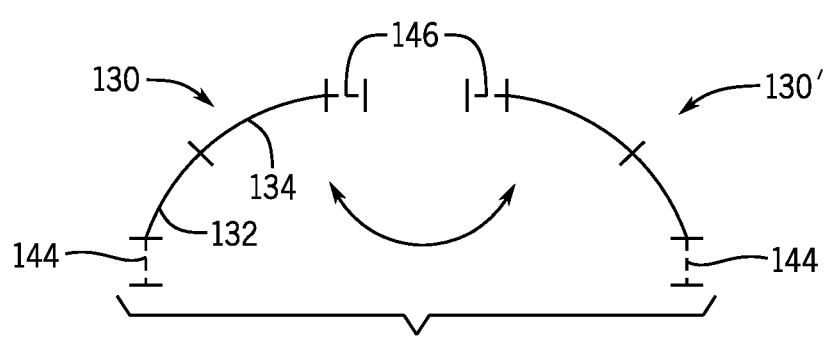

Similarly, FIG. 7G illustrates an embodiment in which a curved track section 130 of the type described above with reference to FIG. 7A is formed symmetrically and in a manner that makes it "flippable", as indicated by reference numeral 130'. Such configurations could also be used for track sections that have any of the geometries and extends described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A linear motor system comprising:
   a permanent magnet mover configured to be displaced by a controlled magnetic field;
   a modular straight track section;
   a modular curved track section positionable adjacent to the modular straight track section to provide a continuous track;
   wherein each track section comprises a plurality of coils energizable to create the controlled magnetic field for movement of the mover, and each track section is configured to support and guide the mover in movement along the track sections; and
   control and driver circuitry coupled to the coils and configured to control energization of the coils to create the controlled magnetic field; and wherein the curved track section has a non-constant radius of curvature that is a non-linear function of a run length along the curved track section.

2. The system of claim 1, wherein the curved track section has a curvature following a geometry that results in the mover, when moving under the influence of coils energized at a fixed rate along the curved track section, experiencing a finite jerk and/or a finite snap.

3. The system of claim 1, wherein the curved track section has a radius of curvature that is proportional to the inverse of the square root of the run length along the curved track section.

4. The system of claim 1, wherein the curved track section has a radius of curvature that is proportional to an inverse of a square of the run length along the curved track section.

5. The system of claim 1, wherein the curved track section has a radius of curvature that is proportional to an inverse of an order of the run length along the curved track section higher than the square.

6. The system of claim 1, wherein the curved track section comprises a plurality of radii of curvature, at least one of the radii of curvature having a non-constant radius of curvature that is a non-linear function of a run length along the curved track section.

7. The system of claim 1, wherein the curved track section comprises an integral straight portion on at least one end thereof.

8. The system of claim 1, wherein the curved track section comprises a portion having a constant radius of curvature.

9. The system of claim 1, wherein the system comprises at least two different curved track sections that extend around different angular segments selected from the group consisting of approximately 22.5 degrees, or approximately 30 degrees, or approximately 45 degrees, or approximately 90 degrees, or approximately 180 degrees.

10. The system of claim 1, wherein the curved track section comprises a plurality of curved portions of progressively increasing curvature each having non-constant radius of curvature that is a non-linear function of a run length.

11. The system of claim 1, wherein the curved track section comprises a plurality of curved portions of progressively decreasing curvature each having non-constant radius of curvature that is a non-linear function of a run length.

12. A linear motor system comprising:
a modular curved track section positionable adjacent to other modular track sections to provide a continuous track, wherein the curved track section has a non-constant radius of curvature that is a non-linear function of a run length along the curved track section.

13. The system of claim 12, wherein the curved track section has a radius of curvature that is proportional to the inverse of the square root of the run length along the curved track section.

14. The system of claim 12, wherein the curved track section has a radius of curvature that is proportional to an inverse of a square of the run length along the curved track section.

15. The system of claim 12, wherein the curved track section has a radius of curvature that is proportional to an inverse of an order of the run length along the curved track section higher than the square.

16. The system of claim 12, wherein the curved track section comprises a plurality of radii of curvature, at least one of the radii of curvature having a non-constant radius of curvature that is a non-linear function of a run length along the curved track section.

17. A linear motor system comprising:
a permanent magnet mover configured to be displaced by a controlled magnetic field;
a modular straight track section;
a modular curved track section positionable adjacent to the modular straight track section to provide a continuous track;
wherein each track section comprises a plurality of coils energizable to create the controlled magnetic field for movement of the mover, and each track section is configured to support and guide the mover in movement along the track sections; and
control and driver circuitry coupled to the coils and configured to control energization of the coils to create the controlled magnetic field; and
wherein the curved track section has a curvature following a geometry that results in the mover, when moving under the influence of coils energized at a fixed rate along the curved track section, experiencing a finite jerk and/or a finite snap.

18. The system of claim 17, wherein the curved track section has a radius of curvature that is proportional to the inverse of the square root of the run length along the curved track section.

19. The system of claim 17, wherein the curved track section has a radius of curvature that is proportional to an inverse of a square or higher order of the run length along the curved track section.

20. The system of claim 17, wherein the curved track section comprises a plurality of radii of curvature, at least one of the radii of curvature having a non-constant radius of curvature that is a non-linear function of a run length along the curved track section.

* * * * *